(12) United States Patent
Creech et al.

(10) Patent No.: US 10,488,224 B2
(45) Date of Patent: Nov. 26, 2019

(54) APPARATUS FOR SENSING THE POSITION OF AN ACTUATOR ASSEMBLY OF A LOCKING GEARSET

(71) Applicant: DANA AUTOMOTIVE SYSTEMS GROUP, LLC, Maumee, OH (US)

(72) Inventors: Michael Z. Creech, Ann Arbor, MI (US); Anne M. Adamczyk, Grand Rapids, MI (US); Michael Schulte, Sylvania, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 65 days.

(21) Appl. No.: 15/577,821

(22) PCT Filed: May 26, 2016

(86) PCT No.: PCT/US2016/034309
§ 371 (c)(1),
(2) Date: Nov. 29, 2017

(87) PCT Pub. No.: WO2016/196187
PCT Pub. Date: Dec. 8, 2016

(65) Prior Publication Data
US 2018/0164128 A1    Jun. 14, 2018

Related U.S. Application Data

(60) Provisional application No. 62/168,018, filed on May 29, 2015.

(51) Int. Cl.
*G01D 5/14* (2006.01)
*F16D 27/118* (2006.01)
*F16D 27/14* (2006.01)

(52) U.S. Cl.
CPC .......... *G01D 5/145* (2013.01); *F16D 27/118* (2013.01); *F16D 27/14* (2013.01); *F16D 2300/18* (2013.01)

(58) Field of Classification Search
CPC .. G01R 31/007; G01R 31/086; G01R 31/025; B60R 16/02; B60L 11/1816; B60L 11/02;
(Continued)

(56) References Cited

U.S. PATENT DOCUMENTS 4,340,133 A    7/1982  Blersch
4,351,254 A    9/1982  Brown
(Continued)

FOREIGN PATENT DOCUMENTS

EP    1568917 A2    8/2005
WO    2008066669 A2    6/2008

OTHER PUBLICATIONS

International Search Report for PCT/US2016/034309 (dated Aug. 1, 2016).
(Continued)

*Primary Examiner* — Giovanni Astacio-Oquendo
(74) *Attorney, Agent, or Firm* — Marshall & Melhorn, LLC

(57) ABSTRACT

An apparatus for sensing the position of an actuator assembly having electromagnetic coil, a pressure plate with a rim on one end thereof, and a sensor assembly attached to the actuator assembly. The sensor assembly includes a follower having a magnet disposed therein and a recess for receiving the rim of the pressure plate, a sensor housing having a slot for receiving the follower, and a sensor fixed within the sensor housing between the sensor housing and the follower.

11 Claims, 5 Drawing Sheets

(58) Field of Classification Search
CPC ............. B60L 2270/00; B60L 2210/14; B60L 2210/12; Y10S 903/903
USPC .................................... 324/503, 500, 509
See application file for complete search history.

(56) References Cited

U.S. PATENT DOCUMENTS

| | | |
|---|---|---|
| 5,126,663 A | 6/1992 | Shinjo |
| 5,196,794 A | 3/1993 | Murata |
| 6,457,545 B1 | 10/2002 | Michaud et al. |
| 7,044,444 B2 | 5/2006 | Blersch |
| 7,151,324 B2 | 12/2006 | Haubold et al. |
| 7,211,020 B2 | 5/2007 | Gohl et al. |
| 7,264,568 B2 | 9/2007 | Ludwig et al. |
| 7,384,359 B2 | 6/2008 | Pinkos et al. |
| 7,425,185 B2 | 9/2008 | Donofrio et al. |
| 7,507,176 B2 | 3/2009 | Pinkos et al. |
| 7,534,187 B2 | 5/2009 | Donofrio et al. |
| 7,572,202 B2 | 8/2009 | Donofrio et al. |
| 7,602,271 B2 | 10/2009 | York et al. |
| 7,682,279 B2 | 3/2010 | Donofrio et al. |
| 7,744,500 B2 | 6/2010 | Donofrio et al. |
| 7,764,154 B2 | 7/2010 | York et al. |
| 7,785,224 B2 | 8/2010 | York et al. |
| 7,825,759 B2 | 11/2010 | York et al. |
| 7,837,585 B2 | 11/2010 | Pinkos et al. |
| 7,876,186 B2 | 1/2011 | York et al. |
| 7,878,314 B2 | 2/2011 | Pinkos |
| 7,942,780 B2 | 5/2011 | Donofrio et al. |
| 8,050,829 B2 | 11/2011 | Johnson et al. |
| 8,057,342 B2 | 11/2011 | Junig et al. |
| 8,057,345 B2 | 11/2011 | Pinkos et al. |
| 8,257,214 B2 | 9/2012 | Knoblauch |
| 8,808,127 B2 | 8/2014 | Seidl et al. |
| 2003/0030958 A1 | 2/2003 | Kiyoshi et al. |
| 2005/0279607 A1* | 12/2005 | Fusegi ............... F16D 27/118 192/84.96 |
| 2007/0068499 A1 | 3/2007 | Schneider et al. |
| 2008/0042791 A1 | 2/2008 | York et al. |
| 2008/0062022 A1* | 3/2008 | Melanson ............ H03M 3/464 341/143 |
| 2008/0079444 A1* | 4/2008 | Denison ................ G01D 5/24 324/679 |
| 2011/0095603 A1* | 4/2011 | Lee ..................... B60L 50/51 307/10.1 |
| 2011/0316473 A1* | 12/2011 | Yen ..................... H02J 7/027 320/107 |
| 2012/0238288 A1 | 9/2012 | Masaaki et al. |
| 2013/0063231 A1* | 3/2013 | Tomimbang ........ H01F 7/124 335/127 |
| 2015/0129389 A1 | 5/2015 | Shao et al. |
| 2016/0294213 A1* | 10/2016 | Morrison .............. H02J 9/061 |

OTHER PUBLICATIONS

International Search Report for PCT/US2015/027865 (dated Aug. 5, 2015).

* cited by examiner

APPARATUS FOR SENSING THE POSITION OF AN ACTUATOR ASSEMBLY OF A LOCKING GEARSET

CROSS-REFERENCE TO RELATED APPLICATIONS

This application claims the benefit of U.S. Provisional Application No. 62/168,018 filed on May 29, 2015, which is herein incorporated by reference in its entirety.

FIELD OF THE INVENTION

The present invention relates to an apparatus for sensing the position of an actuator assembly. More particularly, the invention relates to a sensor assembly attached to the actuator assembly for sensing the position for a locking gearset in a motor vehicle.

BACKGROUND OF THE INVENTION

Locking gearsets can switch between an engaged and disengaged state. Examples of such gearsets can include, but are not limited to, power takeoff units, and axle disconnects, or differentials, as are frequently found in a motor vehicle.

Engagement of a locking gearset can be effected by an actuator. In power takeoff units, axle disconnects, or differentials, the actuator is powered and signaled by the motor vehicle through a controller. As is known in the art, the actuator converts electrical current from the controller into mechanical force. For example, the flow of electrical current creates a magnetic field that moves a pressure plate of the actuator, and through mechanical structure engages or disengages the gearset.

A sensor can be used to relay information regarding the position of the actuator back to the controller. A position sensor provides a signal that is indicative of the position of the locking gearset. Positional sensors are generally of two types: mechanical or magnetic proximity. Prior art mechanical positional sensors can have wear and mounting issues. Prior art magnetic proximity sensors can have accuracy problems based on runout of moving parts and are subject to interfering fields from the adjacent electromagnetic actuator. Many magnetic proximity sensors will be affected by the interfering fields generated by the actuator coil in both the axial and radial directions.

Accordingly, it would be desirable to provide an improved actuator assembly with a sensor assembly that is less sensitive to external magnetic fields and runout out of moving parts.

SUMMARY OF THE INVENTION

The present invention is directed toward an actuator assembly with an electromagnetic coil in an actuator housing, an armature, a slide ring, a pressure plate with a rim on one end thereof, and a sensor assembly attached to the actuator housing. The slide ring is positioned axially outward from the electromagnetic coil and the pressure plate is positioned axially outward of the slide ring. The armature is positioned radially inward from the electromagnetic coil within the actuator housing. The sensor assembly includes a follower having a magnet disposed therein and a recess for receiving the rim of the pressure plate, a sensor housing having a slot for receiving the follower, and a sensor fixed within the sensor housing between the sensor housing and the follower.

The present invention is also directed toward a method of sensing the linear position of a locking gearset. The method includes providing an actuator assembly connected to a locking gearset with an electromagnetic coil in an actuator housing, an armature, a pressure plate, and a sensor assembly attached to the actuator housing. The sensor assembly includes a follower having a magnet disposed therein and recess for receiving the rim of the pressure plate, a sensor housing having a slot for receiving the follower, and a sensor fixed within the sensor housing between the sensor housing and the follower. The method also includes activating the electromagnetic coil by supplying it with current thereby causing axial movement of the pressure plate such that the pressure plate pushes the locking gearset into engagement, translating the axial movement of the pressure plate into axial movement of the magnet and sensing the axial position of the magnet thereby providing information about the linear position of the locking gearset.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1A:
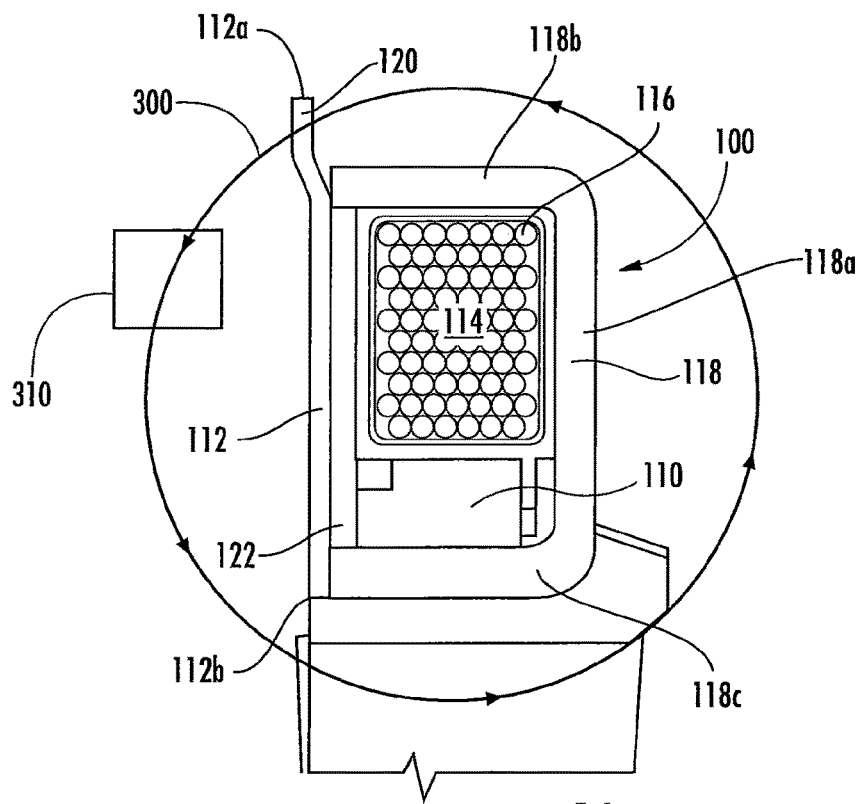
FIGS. 1A and 1B are schematic views of an actuator assembly showing the flux path generated by the actuator and various sensor orientations superimposed thereon in accordance with the present invention.
Figure 1B:
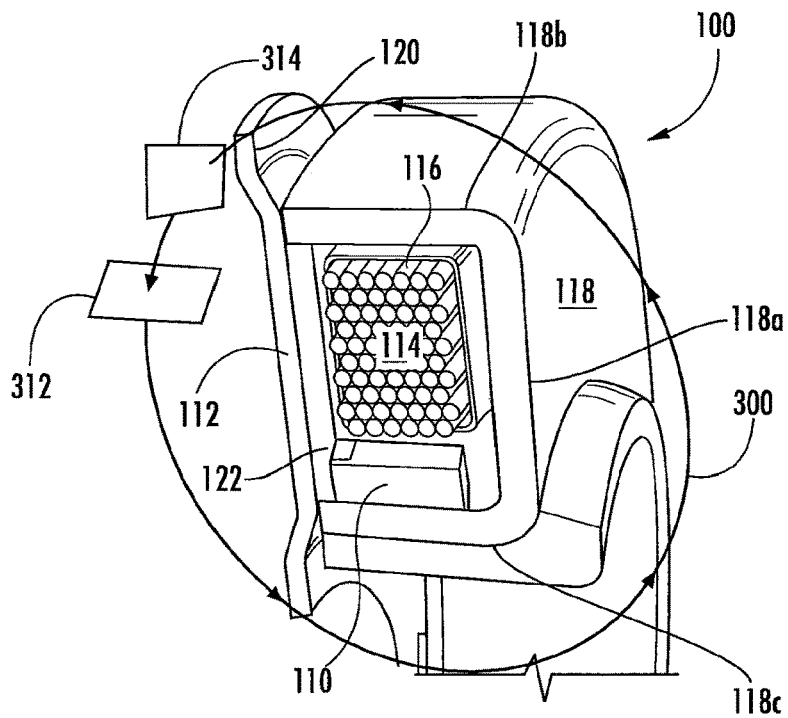

As depicted in FIGS. 1A and 1B, an actuator assembly 100 includes an armature 110, a pressure plate 112, and an electromagnetic coil 114 of copper wires 116 in an actuator housing 118. Armature 110 is positioned radially inward from the electromagnetic coil 114 and within the actuator housing 118. In one embodiment, armature 110 has an L-shaped cross-section as shown in FIG. 2

Pressure plate 112 includes an outer radial end 112a, an inner radial end 112b and a rim 120. The rim 120 is positioned on the outer radial end 112a of pressure plate 112 and is axially offset from inner radial end 112b as shown in FIGS. 1A-1B and FIG. 2. The rim 120 is axially offset from inner radial end 112b so as to be located with a sensor assembly slot, described in more detail below.

A slide ring 122 is positioned axially outward from the electromagnetic coil 114 between the pressure plate 112 and the electromagnetic coil 114. The slide ring 122 has a generally rectangular cross-sectional area. In one embodiment, the actuator housing 118 has a U-shaped cross sectional area with an axial end 118a, an outer radial end 118b and an inner radial end 118c forming a continuous, unitary piece. The axial end 118a is on the opposite side of the electromagnetic coil 114 than the slide ring 122. The slide ring 122 extends radially between the radial ends 118b, 118c of the housing 118 closing the open side of the housing 118. The housing 118 houses the electromagnetic coil 114 and armature 110. The actuator housing 118 and the electromagnetic coil 114 are stationary.

Figure 2:
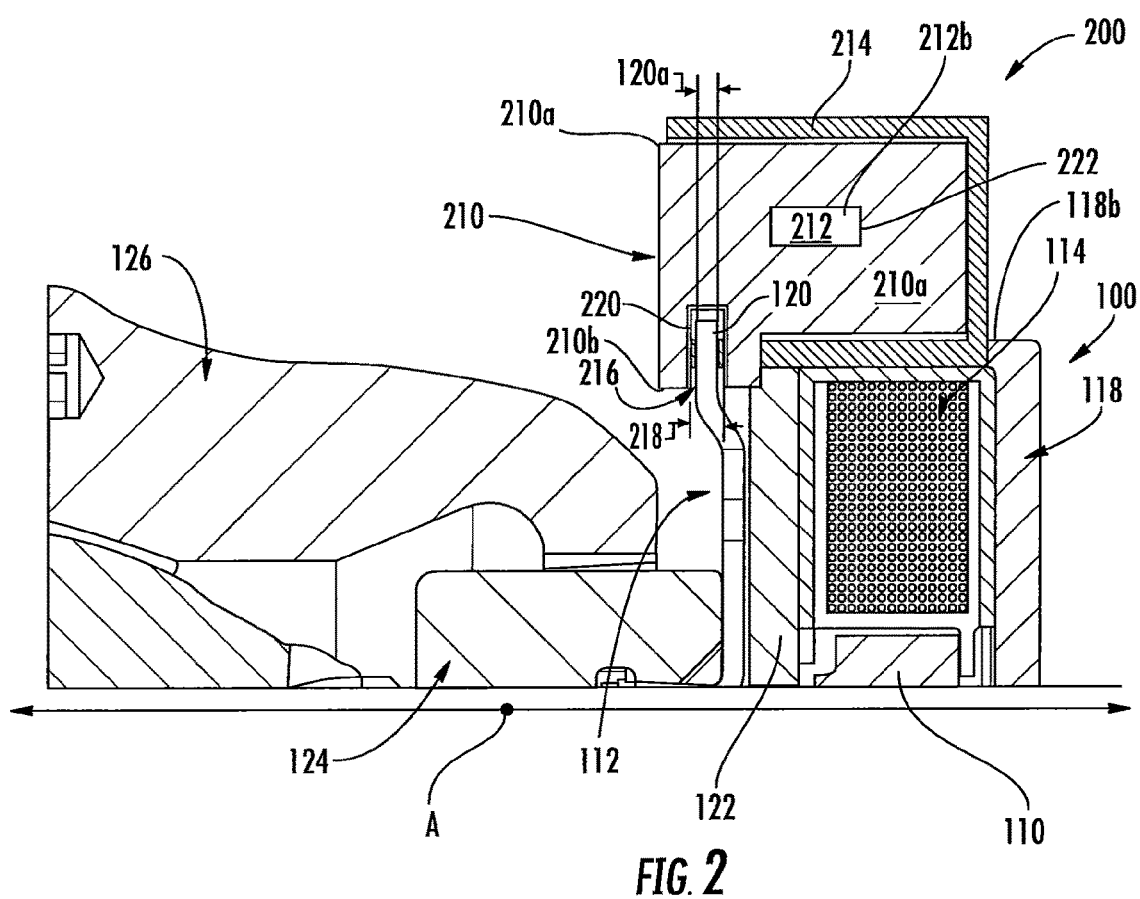
FIG. 2 is a cross-sectional side view of an upper position of an actuator assembly and sensor assembly in accordance with an embodiment of the present invention.
Figure 4:
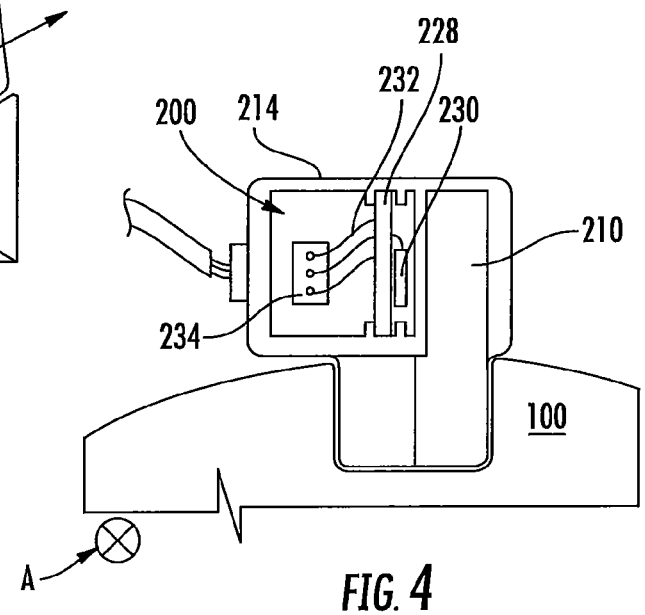
FIG. 4 is a side view of a sensor assembly in accordance with an embodiment of the present invention.

A sensor assembly 200 is attached to the actuator housing 118 on the outer radial end 118b thereof as shown in FIG. 2. FIG. 2 depicts the upper portion of the actuator assembly 100 and the sensor assembly 200. The sensor assembly 200 includes at least one sensor 230, a follower 210 and a magnet 212 disposed therein within a sensor housing 214 as shown in FIGS. 2 and 4. The attachment between the sensor assembly 200 and the actuator housing 118 can be any type of attachment device or method known in the art. In one embodiment, the sensor can be, but is not limited to, a Hall element.

The follower 210 has an outer radial end 210a and an inner radial end 210b and includes a recess 216 within which the rim 120 of the pressure plate 112 is disposed therein as shown in FIG. 2. The recess 216 is positioned on the inner radial end 210b. In one embodiment, the recess 216 is a U-shaped channel and has a recess width 218. The rim 120 of the pressure plate 112 has a rim width 120a. The recess width 218 is larger than the rim width 120a so as to accommodate runout, or side-to-side axial movement, of the pressure plate 112 as it spins around the axis of rotation A during operation of the motor vehicle. The follower 210 is moved in the axial direction by the rim 120 of the pressure plate 112.

The pressure plate 112 spins during operation of the motor vehicle and it is preferable to line the recess 216 with a liner 220. The liner 220 can be made from any material suitable for withstanding rubbing and wear. As a non-limiting example, the follower 210 may be made of a plastic or epoxy material and the liner 220 could be made of metal or other suitable material.

In one embodiment, the follower 210 includes an aperture 222 for the magnet 212 to fit within. The aperture 222 is positioned in the center of the follower 210 such that a surface 212b of the magnet 212 is flush with a front follower surface 210a that faces sensor housing 214 and the sensor, as shown in FIG. 2. In one embodiment, the magnet 212 is oriented with its poles in the axial direction.

Figure 3:
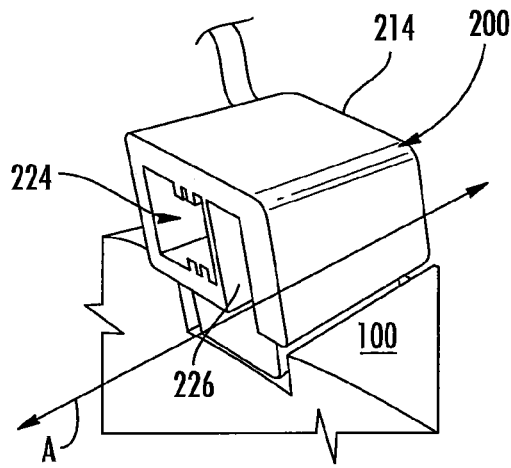
FIG. 3 is a perspective view of the sensor housing in accordance with an embodiment of the present invention.
Figure 5:
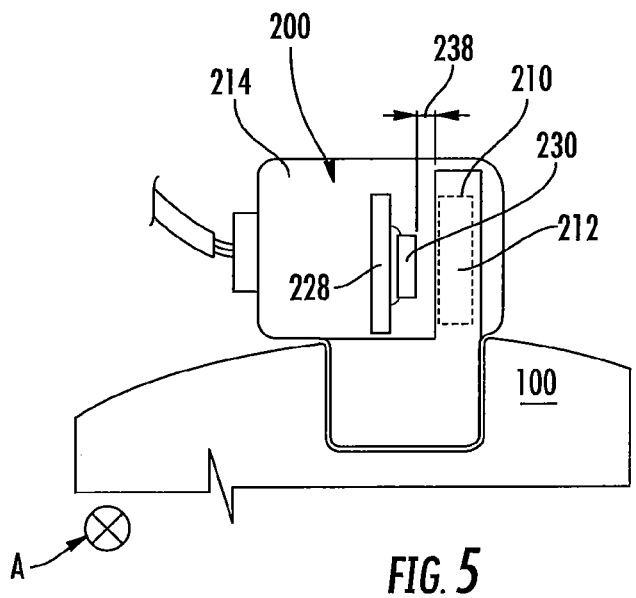
FIG. 5 is a side view of a sensor assembly with a follower and magnet disposed therein in accordance with an embodiment of the present invention.

As shown in FIG. 3, the sensor housing 214 for the sensor assembly 200 includes at least two slots 224 and 226 that are adjacent to one another. The first slot 224 can be used to house a printed circuit board (PCB) 228, as shown in FIGS. 4-6. The second slot 226 houses the follower 210. In a preferred embodiment, the first and second slots 224 and 226 respectively, are rectangular in shape; however, slots 224 and 226 can be any shape required to accommodate the follower 210 and the PCB 228. The slots 224 and 226 are parallel with each other inside the sensor housing 214. The slots 224 and 226 both have at least one open end. The open ends allow for the placement of the PCB 228 or follower 210 with the magnet 212. In one embodiment, the second slot 226 which houses the follower 210 is larger than the first slot 224 which houses the PCB 228.

FIG. 4 depicts the location of the sensor 230 disposed within the sensor housing 214 of the sensor assembly 200. In one embodiment, the sensor 230 can be incorporated into the PCB 228 as shown in FIGS. 4-5. Wires 232 can travel from the PCB 228 external to the sensor assembly 200 via a grommet 234. The sensor 230 is positioned such that it is facing the second slot 226 that accepts the follower 210. The follower 210 is disposed within the second slot 226 thereby placing the face 212b of the magnet 212 adjacent to the sensor 230. The sensor housing 214 can be made of any material known in the art suitable to protect and house the sensor 220 including, but not limited to, epoxies, resins, or plastics. FIG. 5 depicts the sensor 230 and PCB 228 in the sensor housing 214 and the position of the magnet 212, where the follower 210 is indicated by dotted lines.

As depicted in FIG. 1A, the actuator assembly 100 can have magnetic flux path 300 generated by the electromagnetic coil 114 in the plane normal to the copper wires 116 at that point along the electromagnetic coil 114. Upon activation of the actuator assembly 100, current is supplied to the copper wires 116 of the electromagnetic coil 114 and the electromagnet coil 114 produces a magnetic flux path 300 that is normal to the plane of the copper wires 116. Also shown is a first plane of sensing orientation 310 of the sensor 230 superimposed onto the flux path 300. In this configuration, the sensor 230 is oriented such that it senses in the circumferential direction (i.e. in the same plane as the flux path 300). Thus, the first plane of sensing orientation 310 is also a plane normal to the copper wires 116.

FIG. 1B depicts a perspective cross-section schematic of the electromagnetic coil 114 and flux path 300 with a second plane of sensing orientation 312 of a sensor and a third plane of sensing orientation 314 of a sensor superimposed in varying orientations. The second and third planes of sensing orientation 312, 314 are in directions other than circumferential and result in a sensor being sensitive to the flux path 300 generated by the actuator assembly 100. The embodiments of the present invention orient the sensor 230, as shown in FIGS. 4-6, in the circumferential direction to avoid interference from the magnetic flux path 300 of the electromagnetic coil 114 as shown in FIG. 1A.

As shown in FIG. 2, when the actuator assembly 100 is activated, current is supplied to the electromagnetic coil 114, which generates a magnetic field which causes the armature 110 to move in the axial direction and intersect with the slide ring 122, thereby causing the slide ring 122 to move in the axial direction. The slide ring 122 then exerts force on the pressure plate 112, which causes the pressure plate 112 to move away from the actuator assembly 100 linearly in the axial direction when the pressure plate 112 that moves rotates around the axis of rotation A.

In one embodiment, when the actuator assembly 100 is activated, the pressure plate 112 engages a ring 124 adjacent to pressure plate 112 if a differential gear set 126 partly depicted in FIG. 2. As the pressure plate 112 moves axially upon activation/inactivation of the actuator assembly 100, the follower 210 is pushed or pulled along with the pressure plate 112 in the axial direction by contacting a rim 120 of the pressure plate 112.

Figure 6A:
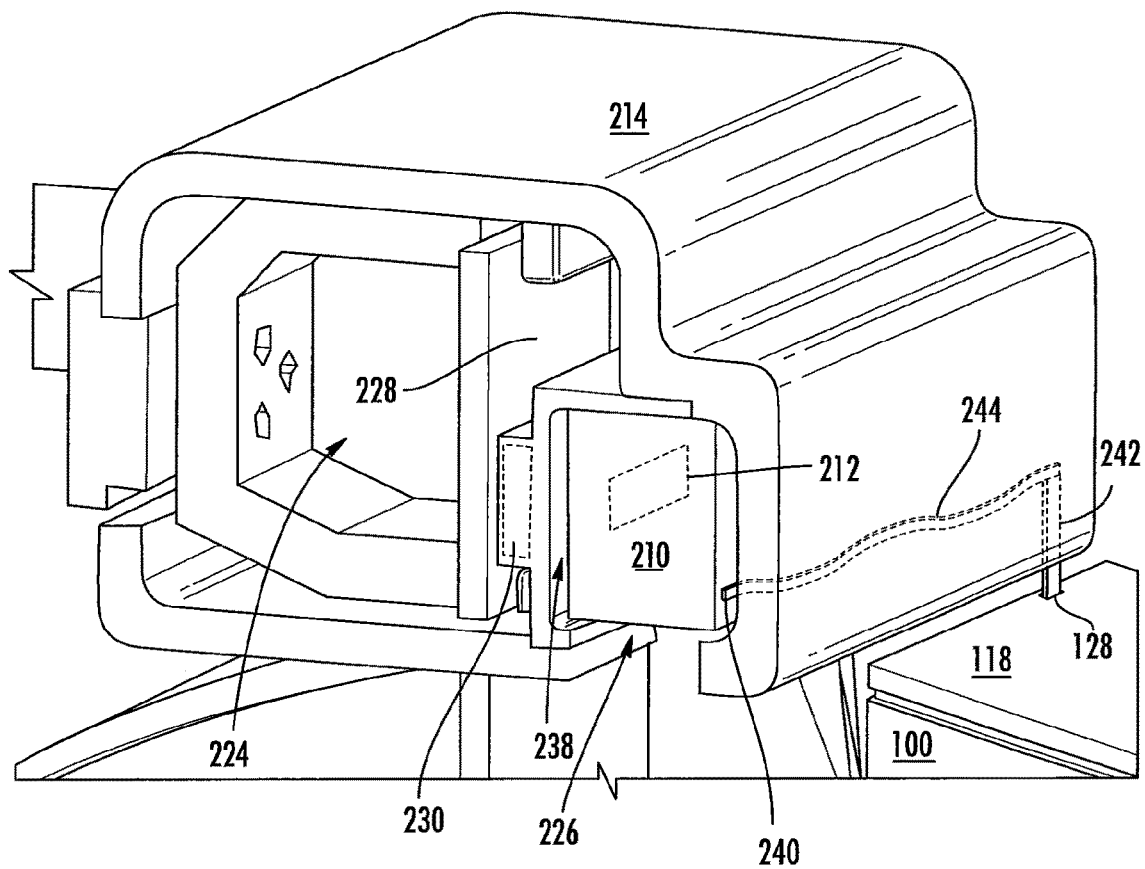
FIG. 6A is a cross-sectional perspective view of a sensor assembly in accordance with an embodiment of the present invention.
Figure 6B:
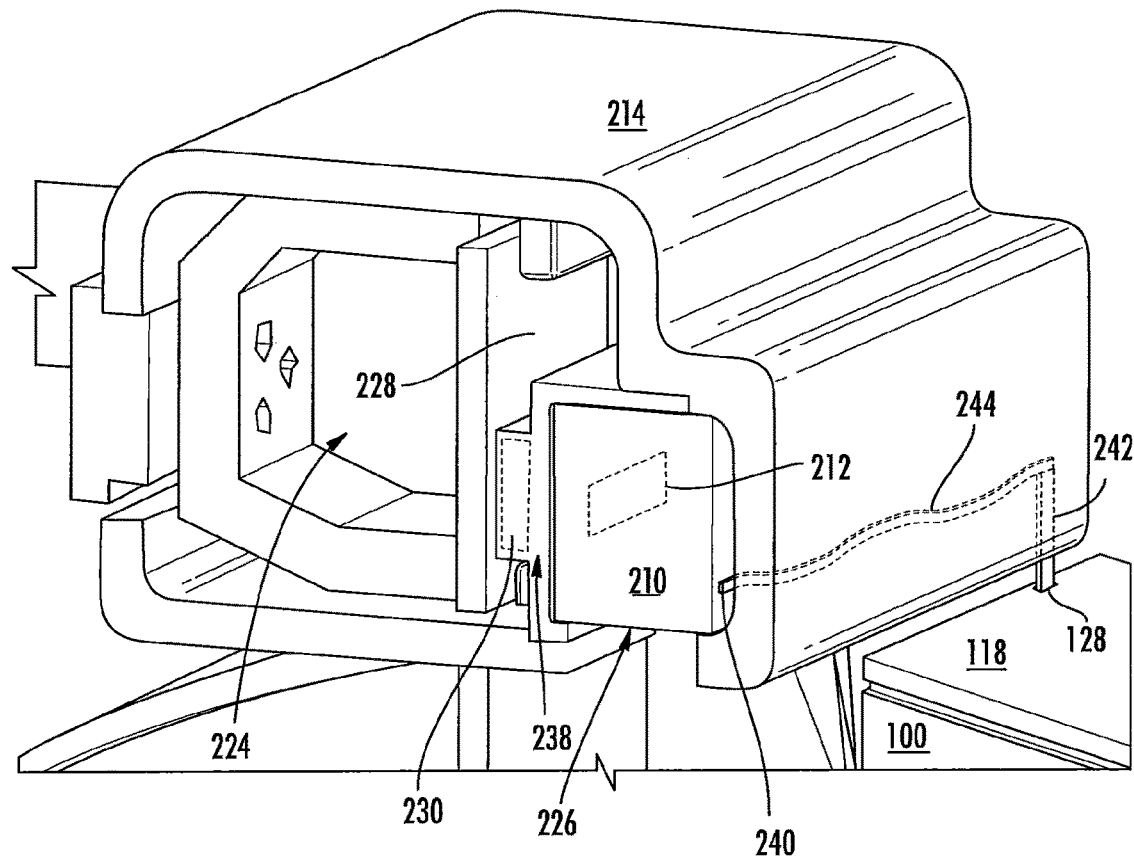
FIG. 6B is a cross-sectional perspective view of a sensor assembly in accordance with an embodiment of the present invention.

The follower 210 moves in the axial direction upon activation of the actuator assembly 100 from a resting position where it is recessed into slot 226, as shown in FIG. 6A, to an activated position where it would protrude from the slot 226, as shown in FIG. 6B. As a result, the magnet 212 slides back and forth in front of the sensor 230 upon activation/deactivation of the actuator assembly 100. As the position of the magnet 212 relative to the position of the sensor 230 changes, the magnetic field around the sensor 230 changes. The sensor 230 detects this change in position and correlates the change to the activation/deactivation of the gearset.

When the actuator assembly 100 is deactivated, the electromagnetic coil 114 is not supplied with current and does not create a magnetic field that causes axial movement of the pressure plate 112. When the current is turned off to the electromagnetic coil 114 and the actuator assembly 100 is deactivated, the pressure plate 112 or downstream mechanical elements (not shown) that engage with the locking gearset (not shown) are returned to their disengaged state via a return mechanism (not shown), such as, but not limited to, a spring (not shown).

Thus, the linear movement along the axis of rotation A of the pressure plate 112 is indicative of the downstream engagement/disengagement of the locking gearset (not shown) and can act as the target for sensing by the sensor assembly 200 described herein. Alternatively, the sensor assembly 200 can provide information regarding the linear position of the pressure plate 112 rather than the engaged/disengaged status of the locking gearset.

In one embodiment, the sensor 230 can change its voltage output in response to a change in the nearby magnetic field. In certain embodiments, converters may convert the voltage output into a different type of output, such as, but not limited to, a pulse width modulated (PWM) signal proportional to distance or a switch that switches between two current levels.

In a preferred embodiment, the magnet 212 and the sensor 230 are separated by a small gap 238 of a predetermined size as shown in FIG. 5. In one embodiment, the gap 238 is between 0.5 mm and 5 mm, between 1 mm and 4.5 mm, between 2 mm and 4.5 mm, or preferably between 3 mm and 4 mm. The presence of the gap 238 of a predetermined size allows for calibration of the sensor 230. Because the sensor 230 is sensitive to changes in nearby magnetic fields, changing the distance between the sensor 230 and the magnet 212 even slightly can drastically affect the output of the sensor 230. Therefore, the gap 238 should be kept constant regardless of the position of the follower 210 to calibrate the sensor 230 and improves the accuracy of the sensor 230. It is preferred to maintain a constant gap 238 despite the axial runout of the pressure plate 112 as it rotates.

In another embodiment, as shown in FIG. 6A, the follower 210 is biased against the sensor housing 214 by at least one spring 240. In one embodiment, the spring 240 is positioned within the sensor housing 214 circumferentially between the sensor housing 214 and the follower 210. In one embodiment, the spring 240 is has an axially extending portion 242 and a radially extending portion 244. The axially extending portion 242 extends from one end of the radially extending portion 244 through the sensor housing 214 and into the actuator housing 118.

Figure 6C:
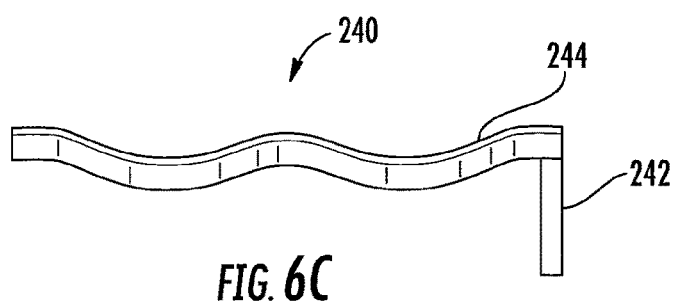
FIG. 6C is a perspective view of a wave spring in accordance with a preferred embodiment of the invention.

In the embodiment shown in FIG. 6C, the at least one spring 240 is a wave spring where the radially extending portion 244 has a wave shape and the axially extending portion 242 is disposed in a hole 128 in the actuator housing 118 as shown in FIG. 6A. The at least one spring 240 biases the follower 210 toward the sensor 230 and maintaining the size of the gap 238 in the circumferential direction.

Although the exemplary embodiments refer to the sensor assembly 200 being used with locking gearsets, the sensor assembly 200 can be used with other similar systems.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed:

1. An apparatus for sensing the position of an actuator assembly, comprising:
   an actuator housing having an outer radial end, an inner radial end and an axial end;
   an electromagnetic coil positioned within the actuator housing;
   an armature positioned radially inward from the electromagnetic coil within the actuator housing;
   a slide ring positioned axially outward from the electromagnetic coil;
   a pressure plate including an outer radial end, an inner radial end, and a rim positioned axially outward from the slide ring, wherein the rim is positioned on the outer radial end of the pressure plate; and
   a sensor assembly attached to the outer radial end of the actuator housing including a follower having a magnet disposed therein and a recess for receiving the rim of the pressure plate, a sensor housing having a slot for receiving the follower, and a sensor fixed within the sensor housing between the sensor housing and the follower.

2. The apparatus of claim 1, wherein the sensor assembly includes a spring, wherein the spring is positioned inside the sensor housing circumferentially between the sensor housing and the follower.

3. The apparatus of claim 2, wherein the spring has a radially extending portion and an axially extending portion wherein the axially extending portion extends from one end of the radially extending portion through the sensor housing and into the actuator housing.

4. The apparatus of claim 2, wherein the spring is positioned inside the sensor housing circumferentially between the sensor housing and the follower to maintain a radially extending fixed gap between the follower and the sensor.

5. The apparatus of claim 1, wherein the slide ring extends between the inner radial end and outer radial end of the housing.

6. The apparatus of claim 1, wherein the sensor assembly includes a radially extending fixed gap between the follower and the sensor.

7. The apparatus of claim 1, wherein the sensor is oriented to sense in a circumferential direction.

8. The apparatus of claim 1, wherein the sensor is a Hall-effect sensor.

9. The apparatus of claim 1, wherein the rim is axially offset from the inner radial end of the pressure plate.

10. The apparatus of claim 1, wherein the actuator assembly is connected to a locking gearset.

11. The apparatus of claim 10, wherein the locking gearset is a differential.

* * * * *